(12) United States Patent
Inagaki

(10) Patent No.: US 8,296,460 B2
(45) Date of Patent: Oct. 23, 2012

(54) METHOD AND APPARATUS FOR COMMUNICATING DATA AND PROGRAM THEREOF

(75) Inventor: Osamu Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 319 days.

(21) Appl. No.: 11/785,890

(22) Filed: Apr. 20, 2007

(65) Prior Publication Data
US 2008/0082632 A1    Apr. 3, 2008

(30) Foreign Application Priority Data

Sep. 29, 2006  (JP) ................................. 2006-266332

(51) Int. Cl.
*G06F 15/173*    (2006.01)
(52) U.S. Cl. .................. 709/243; 709/231; 709/235
(58) Field of Classification Search .................. 709/231, 709/235, 243
See application file for complete search history.

(56) References Cited

U.S. PATENT DOCUMENTS

| | | | | |
|---|---|---|---|---|
| 4,725,834 A * | 2/1988 | Chang et al. | ................... | 370/451 |
| 5,432,798 A * | 7/1995 | Blair | ............................. | 714/748 |
| 5,727,002 A | 3/1998 | Miller et al. | | |
| 6,507,562 B1 * | 1/2003 | Kadansky et al. | ............ | 370/216 |
| 7,577,750 B2 * | 8/2009 | Shen et al. | ..................... | 709/231 |
| 7,593,333 B2 * | 9/2009 | Li et al. | .......................... | 370/232 |
| 7,925,781 B1 * | 4/2011 | Chan et al. | ..................... | 709/238 |
| 2003/0009538 A1 * | 1/2003 | Shah et al. | ..................... | 709/219 |
| 2004/0205071 A1 * | 10/2004 | Uesugi et al. | ................. | 707/100 |
| 2005/0086469 A1 * | 4/2005 | Dunagan et al. | .............. | 713/163 |
| 2005/0125533 A1 | 6/2005 | Svanbro et al. | | |

FOREIGN PATENT DOCUMENTS

| | | |
|---|---|---|
| EP | 0 698 975 | 2/1996 |
| JP | 2000-089996 | 3/2000 |
| JP | 2000-183873 | 6/2000 |
| JP | 2005-518120 | 6/2005 |
| WO | WO 03/069507 | 8/2003 |

OTHER PUBLICATIONS

Chang et al., "A Reliable Multicast Protocol using Round-robin ACK and Selective Retransmission", Jun. 1995, retrieved from http://citeseerx.ist.psu.edu/viewdoc/summary?doi=10.1.1.39.9566 on May 20, 2009.*

Tang et al., "Reliable Adaptive Lightweight Multicast Protocol", May 15, 2003, retrieved from http://ieeexplore.ieee.org/stamp/stamp.jsp?tp=&arnumber=1204516&isnumber=27114 on May 20, 2009.*

Chang et al., "A Broadcast Protocol for Broadcast Networks", IEEE 1983, Print.*

(Continued)

*Primary Examiner* — Kevin Bates
(74) *Attorney, Agent, or Firm* — Staas & Halsey LLP (57) ABSTRACT

A server assigns one of a plurality of clients as a representative client to each of a plurality of block data in a round-robin manner, for example. The server transmits the block data and information indicating the representative client assigned to the block data to the plurality of clients by multicast communication. The representative client transmits a response acknowledgement to the server. When the server receives the response acknowledgement, the server transmits block data following the block data and information indicating a new representative client assigned to the following block data to the plurality of clients by multicast communication.

13 Claims, 10 Drawing Sheets

OTHER PUBLICATIONS

Jo-Mei Chang et al., "A Broadcast Protocol for Broadcast Networks", Global Telecommunications Conference, Nov. 28, 1983, vol. 2, pp. 649-653.

Ming-Yu Jiang et al., "Family ACK Tree (FAT): A New Reliable Multicast Protocol for Mobile Ad Hoc Networks*", IEEE International Conference on Communications, Conference Proceedings, vol. 1, Apr. 23, 2002, pp. 3393-3397.

JiYeon Son, YooJae Won, SooHyoung Oh, KyungShik Lim, A Performance Analysis of the Reliable Multipeer Protocol (ReMP) for Dynamic Multimedia Communications, Information Networking, 1998. (ICOIN-12) Proceedings., Twelfth International Conference on IEEE Jan. 1998, pp. 652-655.

Japanese Office Action mailed Nov. 16, 2010 issued with respect to Japanese Patent Application No. 2006-266332.

Extended European Search Report, mailed Apr. 28, 2008 and issued in corresponding European Patent Application No. 07107234.2413.

* cited by examiner

| CLIENT | IP ADDRESS | . . . . |
|---|---|---|
| CLIENT#1 | A. B. C. E | |
| CLIENT#2 | A. B. C. F | |
| CLIENT#3 | A. B. C. G | |
| ⋮ | ⋮ | |

METHOD AND APPARATUS FOR COMMUNICATING DATA AND PROGRAM THEREOF

CROSS-REFERENCE TO RELATED APPLICATIONS

This application claims the conventional priority based on Japanese Patent Application No. 2006-266332, filed on Sep. 29, 2006, the disclosures of which are incorporated herein by reference.

BACKGROUND OF THE INVENTION

1. Field of the Invention

This present invention relates to a method and apparatus for communicating data and a program thereof, and more particularly to a method and apparatus for communicating data and a program thereof that divide a large volume of data into a plurality of block data and transmits the plurality of block data from a server to a plurality of clients by multicast communication.

2. Description of the Related Art

In a server-client system, when a server transmits large volume of data to clients, one data is divided into a plurality of blocks (block data) and transmitted because of limitation on hardware in the clients.

In such a server-client system, in order to reduce burdens on the server and reduce loads on a network, it is proposed to establish an efficient system (refer to National Publication of International Patent Application No. 2005-518120 and Japanese Patent Laid-Open No. 2000-089996). That is, the server transmits each of the block data by multicast communication. The predetermined client cashes (stores) the received block data and provides the cashed block data to other clients in response to the request from the other clients.

Figure 13A:
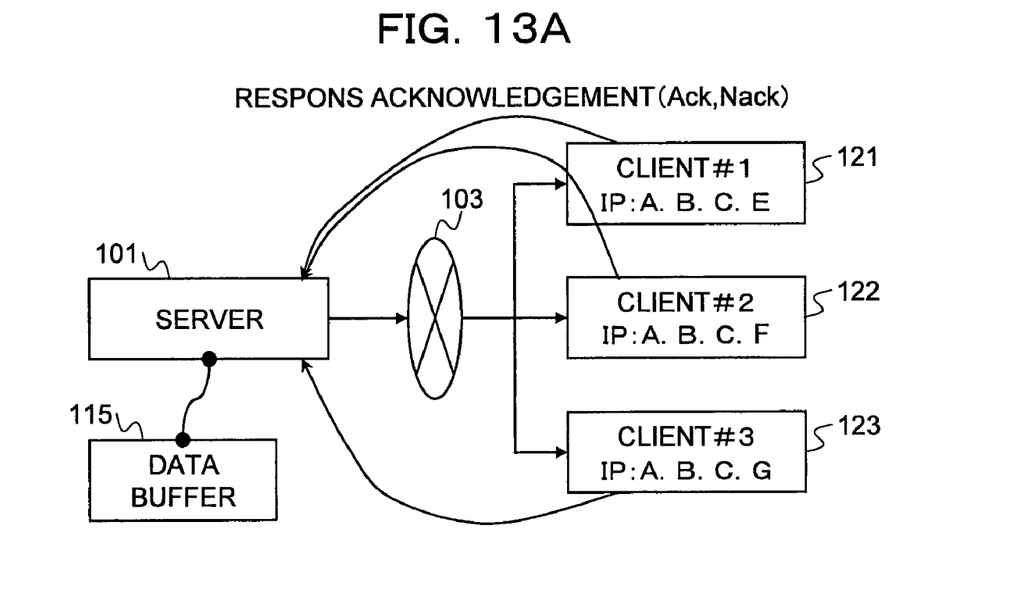
FIGS. 13A and 13B are diagrams showing a structure of a data communication system that forms the background of the present invention.

According to our study, when clients receive the block data transmitted from the server by multicast communication, processing times for the block data are different in the clients due to a difference in performance of the clients. As a result, a time lag in the reception of the block data occurs. Therefore, in order to synchronize all the clients, as shown in FIG. 13A, respective clients 121 to 123 need to transmit response acknowledgements (Ack or Nack) to a server 101 every time reception processing for block data ends. However, in this case, since one server 101 processes the response acknowledgements from all the clients 121 to 123, a delay in processing in the server 101 occurs. Further, the server 101 needs to cache (save) transmitted data considering the delay in processing in the clients 121 to 123. However, in this case, although the server 101 can perform resend processing for all the clients 121 to 123 by caching block data currently being transmitted, performance of the server 101 deteriorates. When there are a large number of clients, performance of the server 101 deteriorates while the performance depends on reception performance of the server 101.

Figure 13B:
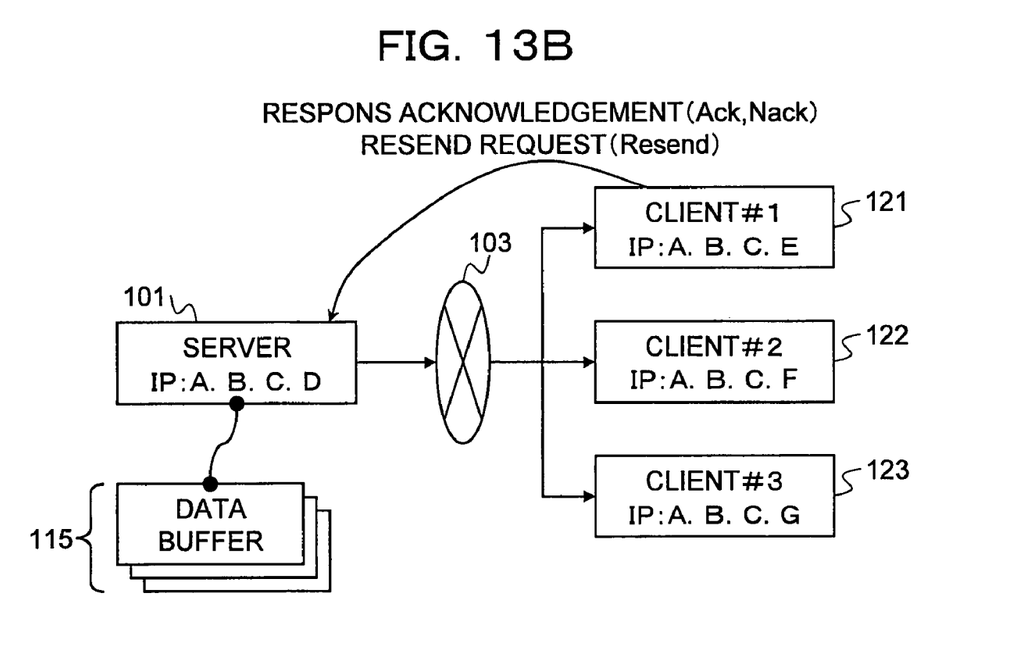

Thus, it is conceivable to perform the response acknowledgement only with one client (a representative client) 121 representing all the clients 121 to 123 as shown in FIG. 13B instead of performing the response acknowledgement with all the clients 121 to 123. However, in this case, processing for the response acknowledgement concentrates on one representative client 121. Furthermore, when the response acknowledgement is performed, there is no guarantee that the clients 122 and 123 other than the representative client 121 end data processing. Moreover, in order to cope with a client in which a delay occurs, the server 101 needs to save all block data. Thus, the server 101 has to include data buffers 115 in a number corresponding to all the block data.

SUMMARY OF THE INVENTION

It is an object of the present invention to provide a method for communicating data that can divide a large volume of data into a plurality of block data and surely transmit the plurality of block data from a server to a plurality of clients by multicast communication without deteriorating performance of a data communication system.

It is another object of the present invention to provide an apparatus for communicating data that can divide a large volume of data into a plurality of block data and surely transmit the plurality of block data from a server to a plurality of clients by multicast communication without deteriorating performance of a data communication system.

It is still another object of the present invention to provide a program for realizing a server that can divide a large volume of data into a plurality of block data and surely transmit the plurality of block data from a server to a plurality of clients by multicast communication without deteriorating performance of a data communication system.

The method for communicating data of the present invention is the method for communicating data with which a server transmits data including a plurality of block data to a plurality of clients by multicast communication. The method comprises assigning, in the server, one of the plurality of clients as a representative client that transmits a response acknowledgement when a block data is received to each of the plurality of block data in a predetermined order, transmitting, in the server, a block data among the plurality of block data to the plurality of clients together with information indicating the representative client among the plurality of clients assigned to the block data by multicast communication, transmitting, in the representative client, the response acknowledgement to the server, and transmitting, in the server, block data following the block data among the plurality of block data to the plurality of clients together with information indicating a new representative client among the plurality of clients assigned to the following block data by multicast communication when the server receives a response acknowledgement from the representative client.

Preferably, in an embodiment of the present invention, prior to start of the transmission of the data, the server creates, based on communication with the plurality of clients, a client list in which the plurality of clients that receive the data are registered. The server assigns the representative client to each of the plurality of block data based on the client list in an order of registration in the client list in a round-robin manner.

Preferably, in an embodiment of the present invention, the representative client caches block data to which the representative client corresponds to retransmit the block data to the other clients.

Preferably, in an embodiment of the present invention, the representative client discards the cached block data after receiving information indicating that the representative client is assigned as a representative client for the second time.

Preferably, in an embodiment of the present invention, the representative client confirms that the representative client normally receives all block data preceding the block data among the plurality of block data and transmits the response acknowledgement to the server based on the confirmation.

The apparatus for communicating data of the present invention is the apparatus for communicating data. The apparatus comprises a responding client determination processing unit assigning one of a plurality of clients as a representative client that transmits a response acknowledgement when a block data is received to each of the plurality of block data forming data in a round-robin manner, and a transmission/reception processing unit transmitting a block data to the plurality of clients together with information indicating the representative client among the plurality of clients assigned to the block data by multicast communication, and transmitting, when the response acknowledgement from the representative client is received, block data following the block data to the plurality of clients together with information indicating a new representative client among the plurality of clients assigned to the following block data by multicast communication.

The program for realizing a server in a data communication system of the present invention is the program for realizing a server in a data communication system including the server, a plurality of clients, and a network connecting the server and the plurality of clients. The program causes a computer to execute assigning one of a plurality of clients as a representative client that transmits a response acknowledgement when a block data is received to each of the plurality of block data forming data in a round-robin manner, transmitting a block data to the plurality of clients together with information indicating the representative client among the plurality of clients assigned to the block data by multicast communication, and transmitting, when the response acknowledgement from the representative client is received, block data following the block data to the plurality of clients together with information indicating a new representative client among the plurality of clients assigned to the following block data by multicast communication.

The method for communicating data of the present invention is the method for communicating data in a server that transmits data including a plurality of block data to a plurality of clients by multicast communication. The method comprises assigning one of the plurality of clients as a representative client that transmits a response acknowledgement to the server when a block data is received to each of the plurality of block data forming data in a predetermined order, adding information indicating the representative client assigned to any one of block data to the block data, and transmitting the information to the plurality of clients by multicast communication, and transmitting, when the response acknowledgement from the representative client is received, block data following the block data corresponding to the response acknowledgement to the plurality of clients together with information indicating a new representative client assigned to the following block data by multicast communication.

The method for communicating data of the present invention is the method for communicating data in a client that receives block data from a server by multicast communication. The method comprises assigning, in the server, one of the plurality of clients as a representative client that transmits a response acknowledgement when a block data is received to each of the plurality of block data in a predetermined order, judging, in the client, whether information for identifying the client is added in the block data received from the server, and transmitting, in the client, a response acknowledgement for the received block data to the server when the information for identifying the client is added in the block data.

According to the method for communicating data of the present invention, a server assigns one of a plurality of clients as a representative client (a response acknowledgement client) for each of a plurality of block data in a predetermined order. After assigning the plurality of clients as the representative client for each of the plurality of block data, the server transmits the block data and information indicating the representative client assigned to the block data to the plurality of clients by multicast communication. When the server receives a response acknowledgement from the representative client, the server transmits following block data and information indicating a representative client assigned to the block data to the plurality of clients by multicast communication. Consequently, since the representative client is changed for each of the block data, it is possible to prevent processing for the response acknowledgement from concentrating on one representative client. Since the representative client always receives block data to which the representative client is assigned, in conjunction with the change of the representative client for each of the block data, it is possible to guarantee that the plurality of block data are present in any one of the plurality of representative clients. Therefore, since the server does not need to cache all the block data, it is possible to eliminate burdens on the server.

According to an embodiment of the present invention, the server assigns one of the plurality of clients as the representative client to each of the plurality of block data in an order of registration in a client list in which the plurality of clients are registered, in a round-robin manner. Consequently, it is possible to fixedly and equally assign the plurality of clients as the representative client in a predetermined order.

According to an embodiment of the present invention, the representative client holds block data to which the representative client corresponds. Consequently, it is possible to guarantee that the representative client holds predetermined block data. It is also possible to guarantee that the plurality of block data is equally present in the plurality of clients.

According to an embodiment of the present invention, the representative client discards cached block data after receiving, for the second time, information indicating the representative client is assigned as a representative client. Therefore, the representative client can process, for the block data held, resend requests from the other clients. Consequently, it is possible to equally distribute burdens of resend processing.

According to an embodiment of the present invention, the representative client transmits a response acknowledgement to the server after confirming that the representative client has normally receives all block data preceding block data that the representative client should hold. Consequently, it is possible to guarantee that the representative client always holds block data from starting block data to the block data that the representative client should hold. Therefore, the representative client can process resend requests from the other clients.

DETAILED DESCRIPTION OF THE PREFERRED EMBODIMENTS

Figure 1:
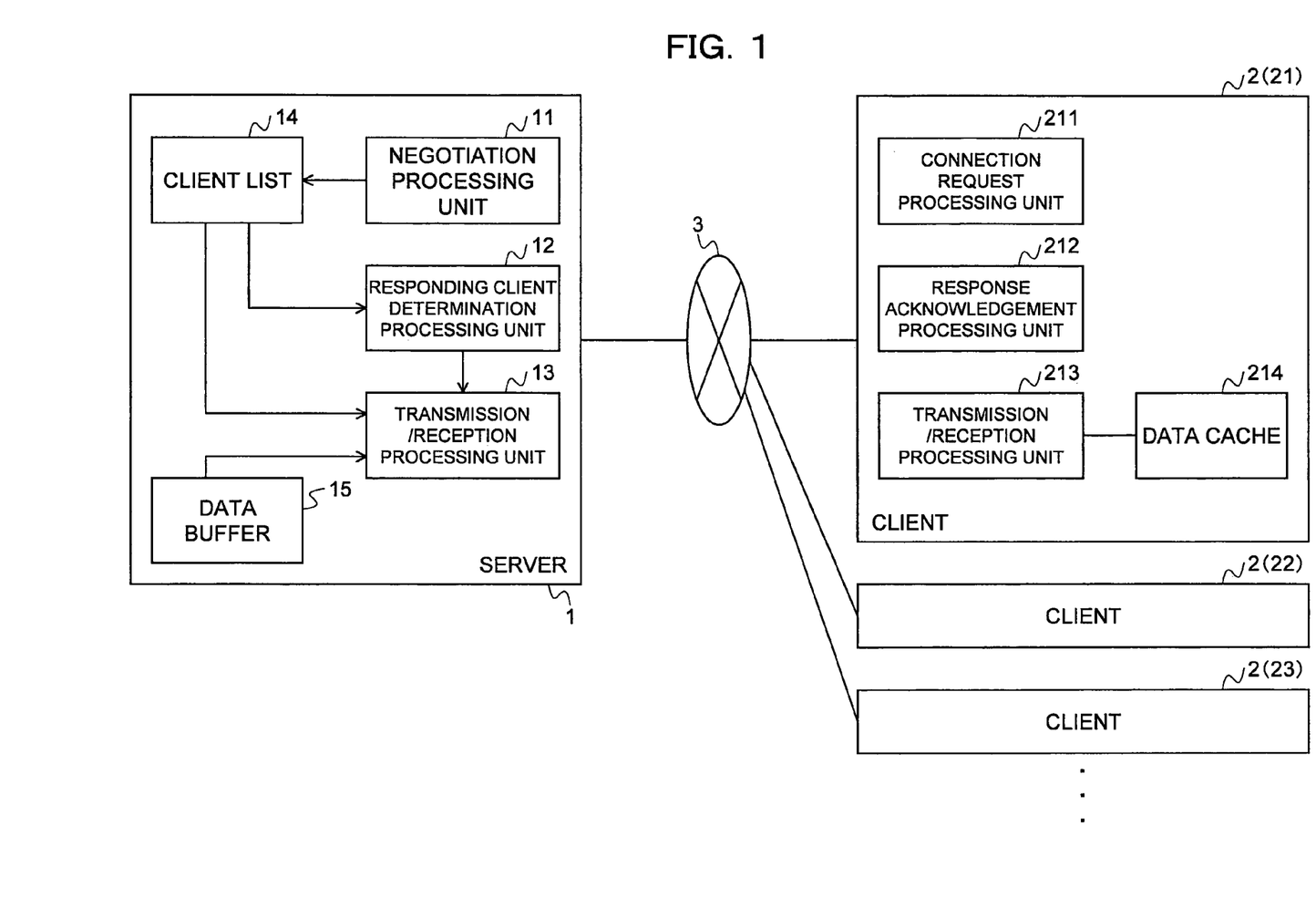
FIG. 1 is a diagram showing an example of a structure of a data communication system according to the present invention.
Figure 2A:
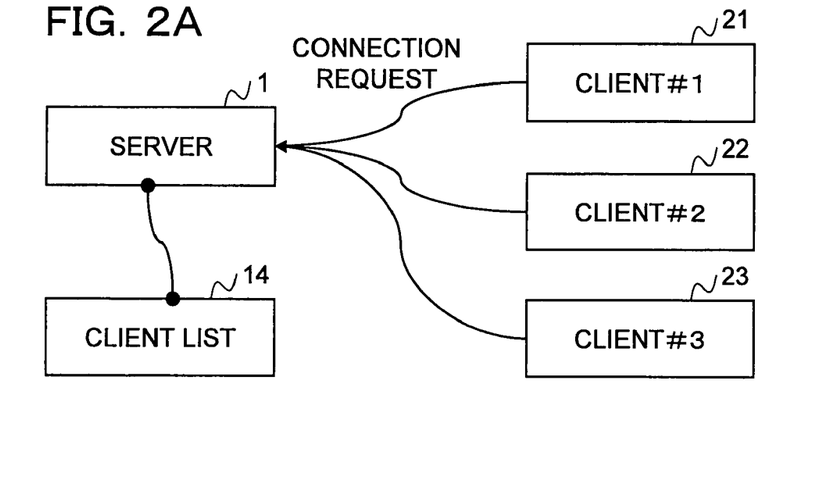
FIGS. 2A to 2C are diagrams for explaining the structure of the data communication system according to the present invention.
Figure 2B:
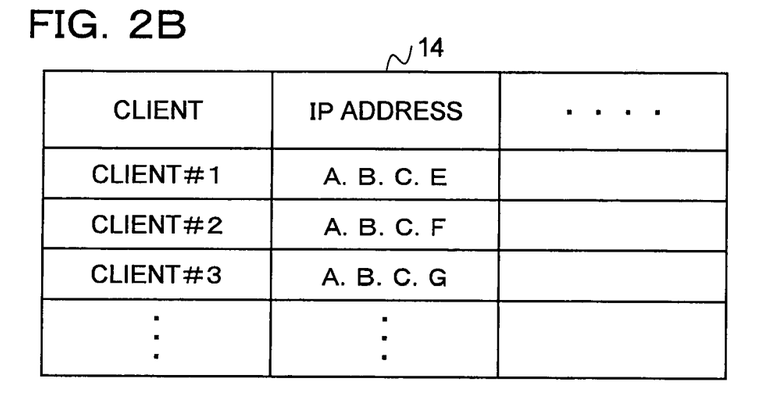
Figure 2C:
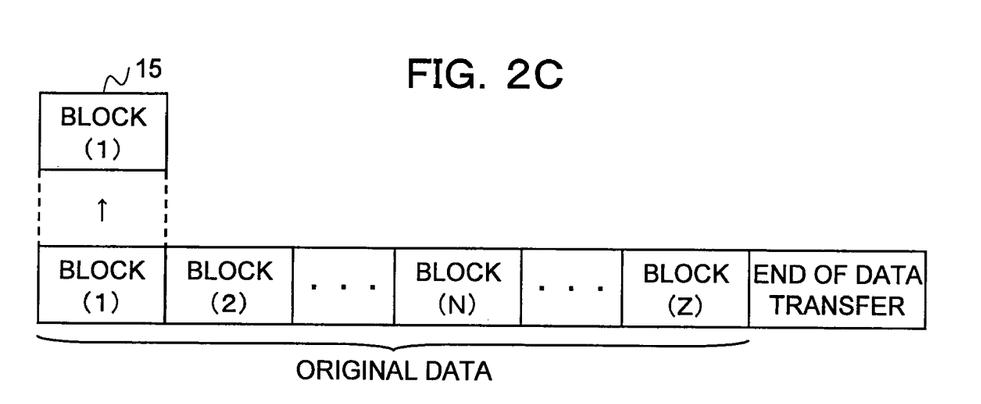

FIG. 1 is a diagram showing an example of a data communication system according to the present invention. FIG. 2 is a diagram for explaining a structure of the data communication system according to the present invention.

The data communication system in FIG. 1 is a computer system (a server-client system) according to a server-client model. The data communication system includes a server 1, a plurality of clients 2 (21 to 23), and a network 3 that connects the server 1 and the plurality of clients 2 (21 to 23). For example, the network 3 includes the Internet and a LAN (Local Area Network) and so on and performs multicast communication or unicast communication.

The server 1 is a data transmission source server (computer) that transmits data by multicast communication. The server 1 performs unicast communication as required. The server 1 includes a negotiation processing unit 11, a responding client determination processing unit 12, a transmission/reception processing unit 13, a client list 14, and a data buffer 15.

The client 21 is a data receiving client (computer) that receives data by multicast communication. The client 21 performs unicast communication as required. The client 21 includes a connection request processing unit 211, a response acknowledgement processing unit 212, a transmission/reception processing unit 213, and a data cache 214. The other clients 22 and 23 are the same as the client 21.

The respective processing units 11 to 13 and 211 to 213 are realized when CPUs (not shown) of computers functioning as the server 1 and the clients 2 execute processing programs of the processing units present on main memories (not shown) of the computers.

In the server 1, the negotiation processing unit 11 performs negotiation processing prior to the start of transmission of data. The negotiation processing is processing for registering the clients 2 which receive data from the server 1 by multicast communication in the server 1 in advance.

Specifically, as shown in FIG. 2A, the negotiation processing unit 11 receives requests for connection to multicast communication from the connection request processing units 211 of the clients 2 until the server 1 is instructed to start data transfer. The clients 2 desiring to receive the data transmit the connection requests to the server 1 through the connection request processing units 211. The negotiation processing unit 11 creates the client list 14 of all the clients 2 from which the connection requests have been received based on communication with the clients 2.

As shown in FIG. 2B, the client list 14 is a list in which a plurality of clients 2 that receive data by multicast communication are registered. The client list 14, for example, stores (registers) an IP address and so on of a client in association with the client (name) for each client (name). An order of registration is an order of reception of the connection requests to the server 1.

The transmission/reception processing unit 13 divides, prior to the start of transmission of data, the data to be transmitted into a plurality of block data as shown in FIG. 2C. A size of the block data is set to, for example, a fixed length. For example, the transmission/reception processing unit 13 divides one data (original data) into block data with block data numbers (hereinafter referred to as block numbers) 1 to Z that are unique in the data. Block data with a block number (N−1) is referred to as block data (N−1). The block data (N−1) is simply represented as a block (N−1).

The block data is also divided into a plurality of data having a size smaller than the block data (hereinafter referred to as unit data). Actual transmission is performed for each of the unit data. Data numbers that are unique in the block data are given to the unit data.

One data is stored in, for example, a memory (not shown). As shown in FIG. 2C, the transmission/reception processing unit 13 extracts one block data, which should be transmitted, of the data from the memory and stores the block data in the data buffer 15. Therefore, the data buffer 15 stores only block data presently being transmitted by the transmission/reception processing unit 13. Consequently, the server 1 only has to cache the block data presently being transmitted. Thus, only one data buffer 15 has to be provided and a size of the data buffer 15 may be small.

The responding client determination processing unit (hereinafter referred to as determination processing unit) 12 assigns, prior to the start of transmission of data, (processing by) the representative client 2 for each of the plurality of block data based on the division of the data. Consequently, the representative client 2 is changed for each of the block data. The representative client 2 is a client (a response acknowledgement client) that transmits a response acknowledgement Ack when the client receives the block data.

The plurality of clients 2 are assigned as the representative client 2 in a predetermined order. The order of the assignment is fixed while one data is transmitted (during one session). Since the number of clients that should be assigned is changed for each session and the number of block data changes for each data, the order of the assignment is changed for each session and each data.

Specifically, the determination processing unit 12 assigns the representative client 2 to each of the plurality of block data based on the client list 14 in a round-robin manner in an order of registration in the client list 14. Round-robin means repeatedly (periodically) assigns orders in a predetermined order.

For example, the client 21, which is a client #1 with a first order of registration, is assigned as the representative client 2 for the block (N−1) based on the client list 14 in FIG. 2B. In this case, a block (N) is assigned to the client 22, which is a client #2, and a block (N+1) is assigned to the client 23, which is a client #3, in a round-robin manner. When all the clients are assigned as the representative client 2 once, respectively, the client 21, which is the client #1, is assigned as a representative client for the block (N+2) for the second time (refer to FIGS. 3 to 6). Consequently, the plurality of clients 2 are equally assigned as the representative client 2 in a fixed order and changed in an order set for each block data (according to the client list 14) in a round-robin manner.

The transmission/reception processing unit 13 transmits data including a plurality of block data to the plurality of clients 2 by multicast communication. Actually, the transmission/reception processing unit 13 transmits the block data to a multicast IP. The plurality of clients 2 are limited to the clients 2 registered in the client list 14 in advance. Specifically, the transmission/reception processing unit 13 transmits one block data (first or leading block data) among the plurality of block data together with information indicating the representative client (a first representative client) 2 assigned to the block data among the plurality of clients. The information indicating the representative client 2 is stored in a predetermined position in a header of a packet (a data packet) including the block data.

On the other hand, in the client 2, the transmission/reception processing unit 213 receives the block data transmitted by multicast communication. Actually, the transmission/reception processing unit 213 receives (the packet of (the same applies to the following explanation)) the block data transmitted to the multicast IP and analyzes the block data. The transmission/reception processing unit 213 knows that the block data is a packet forwarded to the multicast IP and stores the block data in, for example, the memory (not shown).

The transmission/reception processing unit 213 checks whether the block data is normally received. When the transmission/reception processing unit 213 fails in the reception, the transmission/reception unit 213 transmits (a packet including, the same applies in the following explanation) a resend request Resend. This resend request Resend is transmitted by multicast communication. Unlike the response acknowledgement Ack, the resend request Resend is transmitted when the transmission/reception processing unit 213 fails in reception of, for example, a unit data in the block data (for example, when there is no unit data or the unit data includes an error).

The resend request Resend is always transmitted by multicast communication. This is because the client 2 cannot know which of the other clients 2 hold block data for which the resend request Resend is transmitted.

In the server 1, the transmission/reception processing unit 13 receives, from the client 2, a resend request Resend for block data presently being transmitted. At this point, the block data is cached in the data buffer 15 of the server 1. Therefore, the transmission/reception processing unit 13 retransmits, by multicast communication, resend data for the block data being presently transmitted. The server 1 retransmits only the resend data for the block data presently being transmitted. The resend data is transmitted as (a packet including (the same applies in the following explanation)) a response ResendData for the resend request Resend.

The response ResendData is transmitted by multicast communication. This is because, when a plurality of resend requests Resend for the block data are simultaneously transmitted, the response ResendData only has to be transmitted once. The response ResendData may be transmitted using unicast communication.

On the other hand, for block data already transmitted to the server 1 (the transmission/reception processing unit 13), resend data is retransmitted from any one of the plurality of clients 2 by multicast communication. The server 1 does not resend the block data. At this point, the block data is not present in the data buffer 15 of the server 1.

In the server 1, when the transmission/reception processing unit 13 ends the transmission of one block data, the transmission/reception processing unit 13 sends to and receives from the representative client 2 corresponding to the block data a response acknowledgement Ack or Nack (hereinafter simply referred to as response acknowledgement Ack). The response acknowledgement Ack or Nack is (a packet including (the same applies in the following explanation)) information indicating that the transmission/reception processing unit 13 succeeds to receive the data (the block data) (normally receives the data) or fails to receive the data. When the transmission/reception processing unit 13 receives a response acknowledgement Ack for the block data from the representative client 2, the transmission/reception processing unit 13 ends the transmission of the block data and transmits the next block data. When the transmission/reception processing unit 13 receives a response acknowledgement Nack, the transmission/reception processing unit 13 resends the block data based on a data number in a block described in the Nack.

When the client 2 is the representative client 2, the response acknowledgement processing unit 212 of the client 21 confirms that the representative client 2 has normally received block data preceding block data (preceding block data) to which the representative client 2 corresponds (for which the representative client 2 should perform response acknowledgement). The response acknowledgement processing unit 212 transmits a response acknowledgement Ack to the server 1 based on the confirmation. Consequently, it is guaranteed that the block data transmitted from the server 1 has been surely received in the representative client 2.

Since the representative client 2 knows an IP address of the server 1, the response acknowledgement Ack is transmitted to the server 1 using unicast communication. Consequently, the response acknowledgement Ack is surely transmitted to the server 1. The response acknowledgement Ack may be transmitted by multicast communication.

In the server 1, when the transmission/reception processing unit 13 receives the response acknowledgement Ack from the representative client 2, the transmission/reception processing unit 13 transmits block data (second or following block data) following the block data to which the representative client 2 corresponds, to the plurality of clients 2 by multicast communication together with information indicating the representative client (second representative client) 2 assigned to the second block data.

The representative client 2 includes the data cache 214 for retransmission and caches block data, to which the representative client 2 corresponds, in order to retransmit the block data to the other clients 2. That is, when the client 21 is the representative client 2, the transmission/reception processing unit 213 stores, in the data cache 214, block data that the client 21 should cache (hold). The block data stored in the data cache 214 is block data for which the client 21 should send the response acknowledgement Ack to the server 1. Therefore, the server 1 does not have to include a cache for data. Data in the entire system are guaranteed simply by resending block data only to the representative client 2 to which the block data is presently being transmitted. The representative client 2 discards the cached block data after receiving information indicating that the representative client 2 is assigned as the representative client 2 for the second time.

In the representative client 2, the transmission/reception processing unit 213 transmits, prior to transmission of the response acknowledgement Ack, a resend request Resend for block data, which has not been normally received, among block data preceding the block data to the other clients 2 among the plurality of clients 2. The transmission/reception processing unit 213 receives the block data, which have not been normally received, from the other clients 2.

On the other hand, when the (representative) client 2 receives retransmission requests Resend for the cached block data from the other clients 2 among the plurality of clients 2, the client 2 transmits the block data by multicast communication or unicast communication. That is, when a received packet is a resend request Resend and is block data for which the client 2 as the representative client 2 sends and receives the response acknowledgement Ack, the client 2 responds to the resend request Resend.

In the server 1, when the transmission/reception processing unit 13 ends transmission of all the block data, the transmission/reception processing unit 13 transmits data transmission end indicating the end of transmission of data to the plurality of clients 2 by multicast communication. Actually, as shown in FIG. 2C, a packet of the data transfer end is transmitted. It is possible to perform this transmission at a point when transmission of arbitrary block data ends.

The plurality of clients 2 which have received the packet of the data transfer end, respectively confirm that all the plurality of block data have been normally received and transmit response acknowledgements Ack for the data transfer end to the server 1. That is, when reception of block data for all the block data numbers has ended, the plurality of clients 2 transmit the response acknowledgements Ack to the server 1. All the clients 2 transmit the response acknowledgements Ack for the data transfer end by multicast communication or unicast communication. When the reception of block data for all the block data numbers has not ended, the plurality of clients 2 transmit resend requests Resend by multicast communication.

When the transmission/reception processing unit 13 has received the response acknowledgements Ack for the data transfer end from all the clients 2, the transmission/reception processing unit 13 further transmits (a packet of) communication end indicating the end of the communication to all the (plurality of) clients 2. All the clients 2 hold communication (sessions), respectively, until the clients 2 receives packet of the communication end, and prepares for reception of resend requests Resend from the other clients.

As described above, all the clients 2 send to and receive from the server 1 the response acknowledgement Ack, and end the communication according to an instruction from the server 1. That is, the response acknowledgement Ack executed only with the representative client 2 is executed with all the clients 2 only for the data transfer end. Consequently, it is possible to guarantee reception and consistency of all the block data in all the clients 2.

Figure 7:
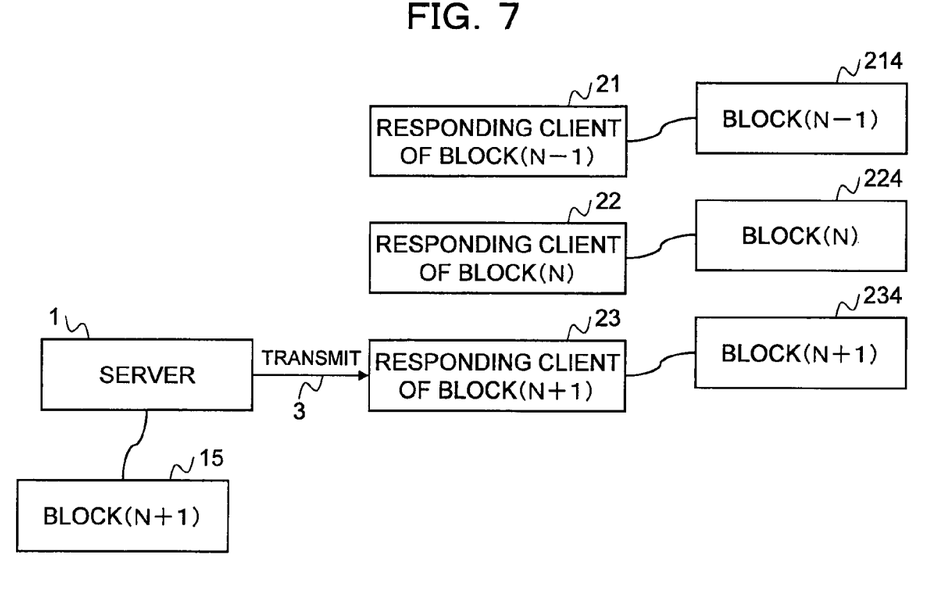
FIGS. 7 and 8 are diagrams for explaining a state of data in the data communication system according to the present invention.
Figure 8:
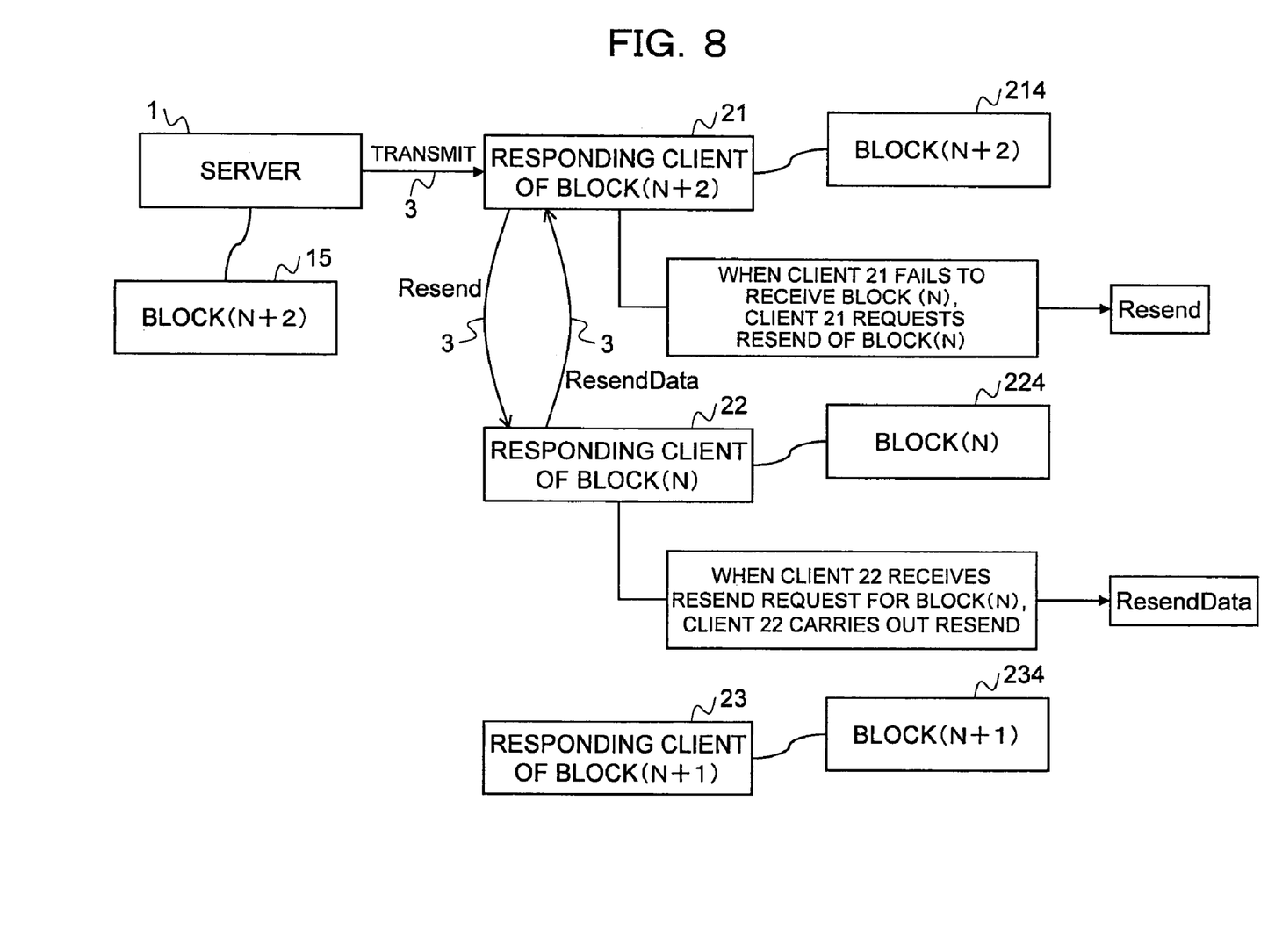

Data communication in the data communication system according to the present invention will be hereinafter specifically explained with reference to FIGS. 3 to 8. FIGS. 3, 4, 5, and 6 are diagrams explaining data communication in the data communication system according to the present invention. Transmission of the block (N−1), transmission of the block (N), transmission of the block (N+1), and transmission of the block (N+2) are shown in FIGS. 3, 4, 5, and 6, respectively. FIGS. 7 and 8 are diagrams explaining a state of data in the data communication system according to the present invention.

Figure 3:
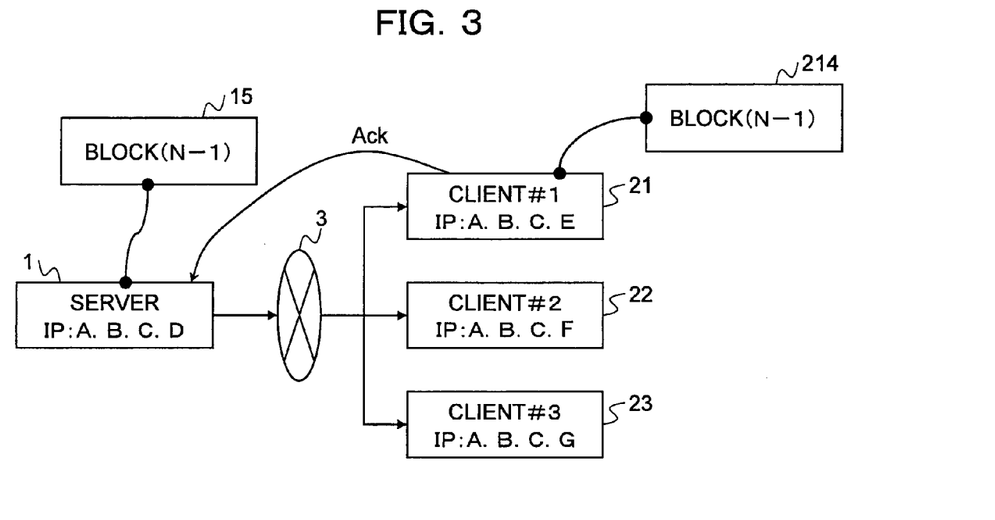
FIGS. 3 to 6 are diagrams for explaining data communication in the data communication system according to the present invention.

As shown in FIG. 3, in the data communication system, the one server 1 and the three clients 21 to 23 are connected to the network 3. The server 1 has an IP address "A.B.C.D" and the clients 21, 22, and 23 have IP addresses "A.B.C.E", "A.B.C.F", and "A.B.C.G", respectively. The network 3 has a multicast IP address.

The three clients 21, 22, and 23 are registered in the client list 14 of the server 1 in this order. Therefore, client numbers #1, #2, and #3 are allocated to the three clients 21, 22, and 23, respectively. Therefore, the clients 21, 22, and 23 operate as a representative client in this order.

As shown in FIG. 2C, data that should be transmitted by multicast communication is divided into block data with block numbers 1 to Z. The server 1 is presently transmitting the block (N−1) by multicast communication (transmitting the block (N−1) to the multicast IP address). A representative client for the block (N−1) (that is, a representative client at the present point) is the client #1.

In FIG. 3, the representative client #1 at the present point caches the block (N−1) for which the representative client #1 should transmit a response acknowledgement Ack. Consequently, the block (N−1) is saved in the representative client #1. In that case, the representative client #1 confirms that all block data up to the block (N−1), for which the representative client #1 should transmit response acknowledgements Ack, have been normally received in the representative client #1.

The server 1 is transmitting the block (N−1) as if the server 1 is transmitting data of the block (N−1) only to one representative client #1. Further, the server 1 acquires a response acknowledgement Ack only from one representative client #1 (the same holds true for FIGS. 4 to 6). According to the reception of the response acknowledgement Ack, the server 1 ends the transmission of the block (N−1) to be transmitted at this point. The clients #i to #3 receive the block (N−1).

After processing the block (N−1), until the client #1 is assigned as a representative client again next time, the client #1 transmits the data to the other clients #2 and #3 in response to resend requests Resend for the block (N−1) from the other clients #2 and #3. In the client #1, it is guaranteed that the block (N−1) has surely been received.

Figure 4:
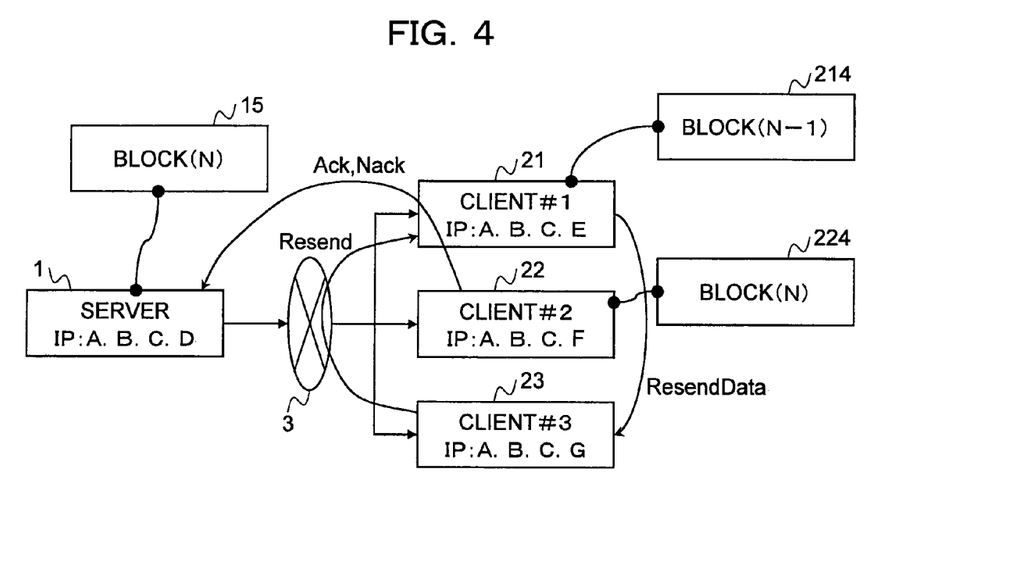

Following the processing in FIG. 3, as shown in FIG. 4, the server 1 changes a block data to be transmitted. That is, the server 1 transmits the block (N) anew instead of the block (N−1) by multicast communication. The server 1 also changes a representative client according to the change of the block data. That is, the client #2 is assigned as the representative client anew instead of the client #1.

In FIG. 4, transmission processing is performed with the representative client 2 changed to the client #2. In the same manner as the client #1, the client #2 caches the block (N). When the client #3 fails to receive the block (N−1), the client #3 requests the client #1 (precisely, the multicast IP) to resend the data of the block (N−1). Since the client #1 holds the block (N−1), the client #1 can resend the data.

At this point, when the client #3 fails to receive the block (N−1), the client #3 transmits a resend request Resend for the block (N−1) to the multicast IP. Since the client #1 holds the block (N−1), the client #1 transmits the block (N−1) to the client #3 as a response ResendData for the resend request Resend. Consequently, it is possible to recover the failure in reception in the client #3. At this point, the server 1 does not cope with the resend request Resend from the client #3. On the other hand, the client #2 transmits a response acknowledgement Ack to the server 1. Consequently, it is guaranteed that data up to the block (N) have been surely received by the client #2.

In this way, the server 1 ends the transmission by multicast communication of the block (N) to be transmitted at this point. The clients #1 to #3 receive the block (N). The representative client #2 confirms normal reception of the data up to the block (N) for which the representative client #2 should transmit a response acknowledgement Ack. Thereafter, the representative client #2 transmits the response acknowledgement Ack for the block (N) to the server 1.

Figure 5:
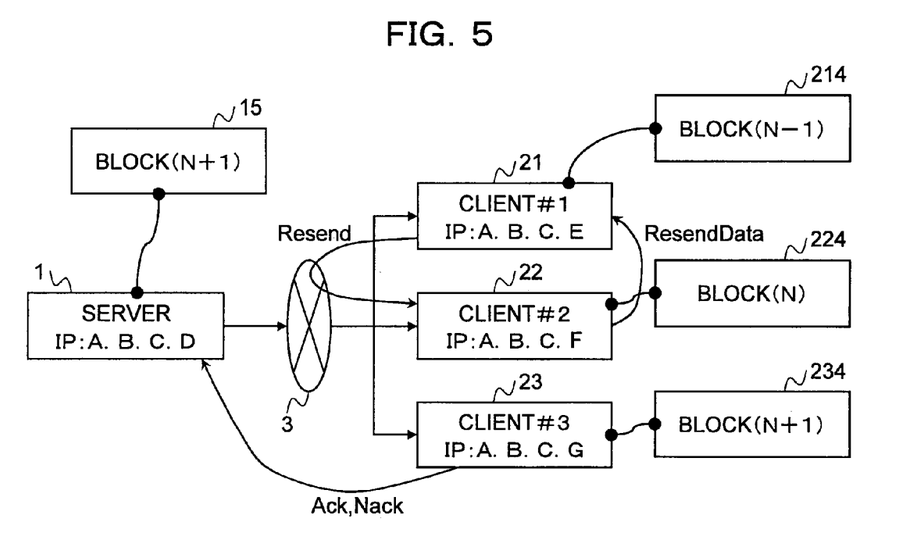

Following the processing in FIG. 4, as shown in FIG. 5, the server 1 changes a block data to be transmitted. That is, the server 1 transmits the block (N+1) anew instead of the block (N) by multicast communication. The server 1 also changes a representative client according to the change of the block data. That is, the client #3 is assigned as the representative client anew instead of the client #2.

In FIG. 5, transmission processing is performed with the representative client changed to the client #3. In the same manner as the clients #1 and #2, the client #3 caches the block (N+1).

When the client #1 fails to receive the block (N), the client #1 sends a resend request Resend for the block (N) to the multicast IP. Since the client #2 caches the block (N), the client #2 resends the block (N). Consequently, the client #1 can recover the failure in reception of the block (N).

The client #3 transmits a response acknowledgement Ack for the block (N+1). Consequently, it is guaranteed that block data up to the block (N+1) is surely held in the client #3.

In this way, the server 1 ends the transmission by multicast communication of the block (N+1) to be transmitted at this point. The clients #1 to #3 receive the block (N+1). The representative client #3 confirms normal reception of the data up to the block (N+1) for which the representative client #3 should transmit a response acknowledgement Ack. Thereafter, the representative client #3 transmits the response acknowledgement Ack for the block (N+1) to the server 1.

Figure 6:
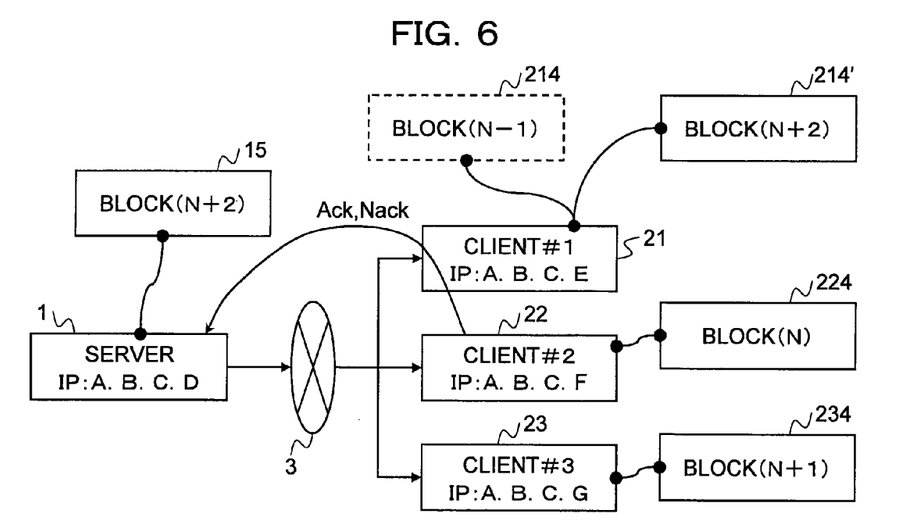

Following the processing in FIG. 5, as shown in FIG. 6, the server 1 changes a block data to be transmitted. That is, the server 1 transmits the block (N+2) anew instead of the block (N+1) by multicast communication. The server 1 also changes a representative client according to the change of the block data. That is, the client #1 is assigned as the representative client again instead of the client #3.

In FIG. 6, the block (N+2) is subjected to response acknowledgement and cached by the client #1 again according to a round-robin in the client list 14. As in the case described above, the client #1 executes processing for the block (N+2).

The transmission of the block (N+2) by the client #1 means that the server 1 have always received a response acknowledgement Ack for the block (N+1) prior to the transmission. Therefore, at that point, the other clients #2 and #3 have surely received all the block data from the block (N−1) to the block (N+1). Therefore, the client #1 can discard the block (N−1) for which the previous response acknowledgement Ack is sent.

That is, since the clients #2 and #3 have transmitted response acknowledgements Ack for the block (N) and the block (N+1), it is guaranteed that the clients #2 and #3 have always received the block (N−1). Thus, the client #1 can discard the block (N−1). Therefore, strictly speaking, the processing for the block (N−1) is completed at this point. In this way, while all the clients 2 are assigned as the representative client 2 once, the block data (N−1), (N), and (N+1) received by client 2 are received by all the clients 2.

The processing described above is summarized as shown in FIGS. 7 and 8. In FIG. 7, the server 1 is presently transmitting the block (N+1). The client 23 is the representative client 2. The other clients 21 and 22 are receiving (acquiring) the same block (N+1) by multicast communication. Since the server 1 is transmitting the block (N+1), the server 1 has received a response acknowledgement Ack for the block (N) prior to the transmission. The same holds true for the other block data. Therefore, it is guaranteed that the block data up to the block (N) are normally received by any one of the clients 2 and present in the client 2.

In FIG. 8, the server 1 transmits the block (N+2). According to the transmission of the block (N+2), the client 21 is assigned as the representative client 2. The representative client 21 has normally received data while all the clients 2 are assigned as the representative client 2 once. Therefore, the representative client 21 has surely received block data from the block (N−1) to the block (N+1). In this way, it is guaranteed that, while all the clients 2 are assigned as the representative client 2 once, block data transmitted have been received by all the clients 2.

When the representative client 21 fails to receive the block (N+2) in this state, the server 1, which receives a resend request Resend for the block (N+2), retransmits the block (N+2). When the other clients 22 and 23 fail to receive the block (N+2), the representative client 21, which receives resend requests Resend for the block (N+2), retransmits the block (N+2).

For example, when the client 21 fails to receive the block (N), the client 21 transmits a resend request Resend for the block (N). The representative client 22 for the block (N), which receives the resend request Resend, retransmits the block (N). That is, the representative client 22 transmits a response ResendData.

In this way, since the representative client 2 caches data and the clients 21 to 23 are assigned as the representative client 2 one after another in a round-robin manner, it is possible to surely perform processing without providing a cache in the server 1. It is possible to cope with a failure in reception of data in the client 2. Moreover, even if there are several hundred to several thousand clients 2, it is possible to simultaneously perform transmission and reception by multicast communication. Thus, performance of the system does not deteriorate.

Figure 9:
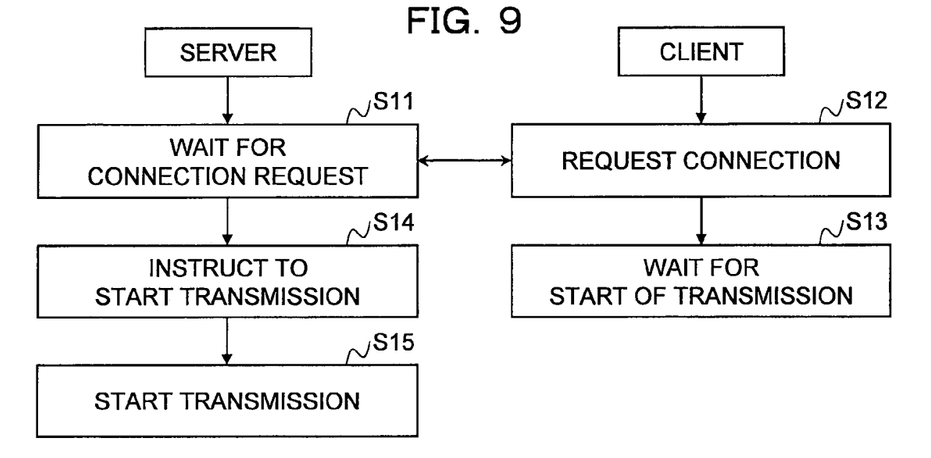
FIG. 9 is a flowchart of a flow of negotiation processing between a server and a client in the data communication system according to the present invention.

FIG. 9 is a flowchart of a negotiation processing flow between the server 1 and the client in the data communication system according to the present invention.

The server 1 is in a state of wait for a connection request from the client 2 (step S11). The client 2 transmits a connection request to the server 1 in this state (step S12) and comes into a state of wait for transmission of data (step S13). When an instruction to start transmission of data is inputted (step S14), at that point, the server 1 ends the reception of the connection request from the client 2, creates the client list 14, determines the representative client 2 based on the client list 14, and starts transmission of the data (step S15).

Figure 10:
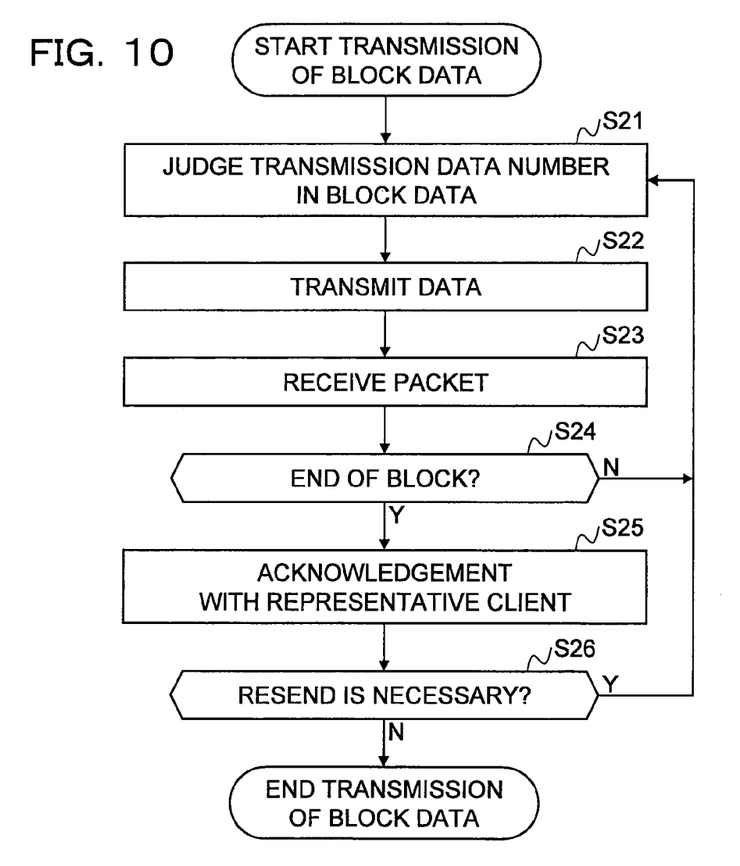
FIG. 10 is a flowchart of a flow of transmission processing executed by the server in the data communication system according to the present invention.

FIG. 10 is a flowchart of a transmission processing flow executed by the server 1 in the data communication system according to the present invention.

Following the processing in FIG. 9, the server 1 starts transmission of block data and judges (checks) a data number in the block data that should be transmitted (step S21). The server 1 transmits a packet including data of the data number (a data packet) by multicast communication (step S22). During the transmission, when the server 1 receives a packet from the client 2 (step S23), the server 1 checks whether the packet is a packet indicating the end of block data (a transfer end packet) (step S24). When the packet is not the transfer end packet (is a packet including a resend request Resend), the server 1 repeats the processing in the steps S21 to S24.

When the packet is the transfer end packet, the server 1 sends to and receives from the representative client 2 a response acknowledgement Ack and checks whether resend of the block data to the representative client 2 is necessary based on the response acknowledgement Ack, (step S25). When the resend is necessary, the server 1 repeats the processing in the steps S21 to S26. When the resend is unnecessary, the server 1 ends the transmission of the block data.

Figure 11:
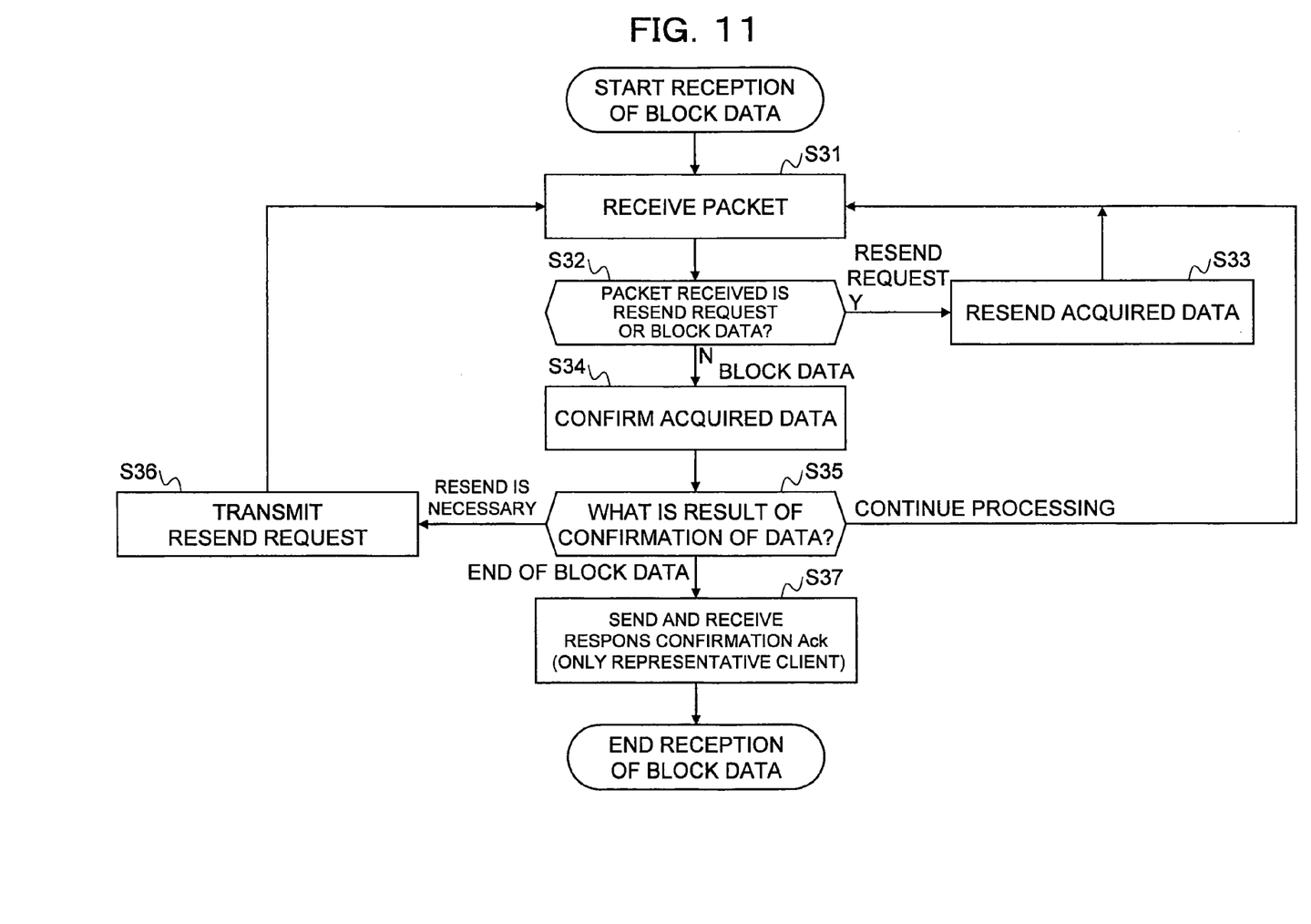
FIG. 11 is a flowchart of a flow of reception processing executed by the client in the data communication system according to the present invention.

FIG. 11 is a flowchart of a reception processing flow executed by the client in the data communication system according to the present invention. FIG. 11 shows processing executed by the client corresponding to the processing in FIG. 10 executed by the server.

The client 2, which starts reception of block data, receives a packet from the server 1 (step S31). The client 2 checks whether the packet is a resend request packet or a data packet (step S32). When the packet is a resend request packet, the client 2 resends block data acquired by the client 2 (step S33) and repeats the processing in the steps S31 and S32.

When the packet is data packet, the client 2 confirms the block data being acquired (step S34). The client 2 checks whether the processing is continued, resend is necessary, or the block data ends (step S35). When the processing is continued, the client 2 repeats the processing in the steps S31 to S35. When resend is necessary, the client 2 transmits a resend request Resend (step S36) and repeats the processing in the steps S31 to S35. When the block data ends, the client 2 sends to and receives from the server 1 a response acknowledgement Ack in case the client 2 is a representative client (step S37) and ends the reception of the block data. When the client 2 is not a representative client, the step S37 is omitted.

Figure 12:
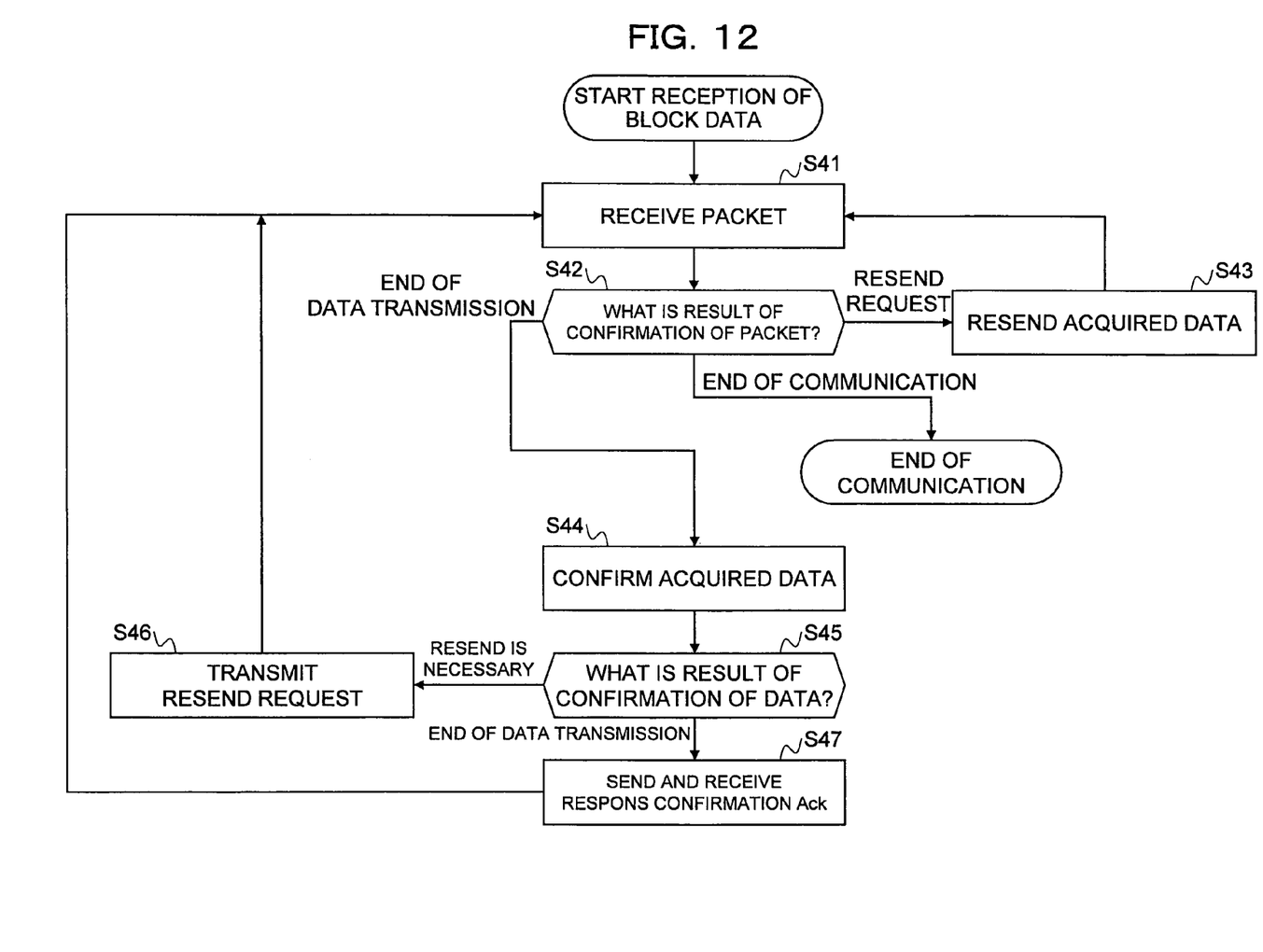
FIG. 12 is a flowchart of a flow of end processing executed by the client in the data communication system according to the present invention.

FIG. 12 is a flowchart of an end processing flow executed by the client in the data communication system according to the present invention.

The client 2, which starts reception of block data, receives a packet from the server 1 (step S41). The client 2 checks whether the packet is a resend request packet, a data transfer end packet, or a communication end packet (step S42). When the packet is a resend request packet, the client 2 resends the block data acquired by the client 2 (step S43) and repeats the processing in the steps S41 and S42.

When the packet is a data transfer end packet, the client 2 confirms the block data being acquired (step S44) and checks whether resend is necessary or the block data ends (step S45). When resend is necessary, the client 2 transmits a resend request Resend (step S46) and repeats the processing in the steps S41 to S45. When the packet is a data transfer end packet, the client 2 sends to and receives from the server 1 a response acknowledgement Ack regardless of whether the client 2 is a representative client (step S47) and repeats the processing in the steps S41 to S45. Therefore, all the clients 2 execute the response acknowledgement Ack.

When the packet is a communication end packet in the step S42, the client 2 ends multicast communication for reception of the block data.

Processing executed by the server 1 corresponding to the processing in FIG. 12 executed by the client 2 is not shown in the figure. The processing is briefly explained as follows. As it is seen from FIG. 12, after the transmission of last block data, the server 1 transmits a data transfer end packet to the clients by multicast communication. After receiving response acknowledgements Ack from all the clients, the server 1 transmits a communication end packet to the clients by multicast communication.

As explained above, according to the method for communicating data of the present invention, it is possible to prevent processing of response acknowledgement from concentrating on one representative client and guarantee that a plurality of block data are present in any one of a plurality of clients. Therefore, it is possible to fixedly and equally assign the plurality of clients as a representative client in a predetermined order. It is possible to guarantee that the representative client always holds block data from starting block data to block data that the representative client should hold. Moreover, the representative client can process resend requests from the other clients for the block data held and equally distribute loads of resend processing to the plurality of clients.

On the other hand, the server only has to cache block data being transmitted and does not have to cache all the block data. Thus, it is possible to eliminate loads on the server for the cache of all the block data. The server does not have to perform resend processing for block data already transmitted. Thus, it is possible to eliminate loads on the server for the resend processing for the block data already transmitted.

Therefore, even when the number of clients increases, it is possible to prevent communication speed from dropping because of the increase in the number of clients. Even when the server 1 executes a plurality of communication sessions, it is possible to prevent communication speed from dropping because of the execution of the communication sessions. Consequently, it is possible to realize large scale data communication that is fast and highly reliable.

What is claimed is:

1. A method for communicating data with which a server transmits data including a plurality of block data to a plurality of clients by multicast communication, the method comprising:
    assigning, in the server, one of the plurality of clients as a representative client to one of the plurality of block data in a predetermined order, the representative client transmitting a response acknowledgment when a block data is received;
    transmitting, in the server, first block data among the plurality of block data to the plurality of clients together with information indicating the representative client among the plurality of clients assigned to the first block data by multicast communication;
    transmitting, in the representative client, the response acknowledgement to the server;
    transmitting, in the server, second block data among the plurality of block data to the plurality of clients together with information indicating a new representative client among the plurality of clients assigned to the second block data by multicast communication when the server receives a response acknowledgement from the representative client, the second block data following the first block data;
    caching, in the representative client, the first block data to which the representative client corresponds for retransmitting the first block data to the other clients; and
    discarding, in the representative client, the cached first block data relative to receiving information indicating that the representative client is assigned as a representative client for the second time.

2. The method according to claim 1, wherein the representative client transmits the response acknowledgement to the server by multicast communication or unicast communication.

3. The method according to claim 1, wherein the server divides the data into the plurality of block data prior to start of the transmission of the data and assigns the representative client to each of the plurality of block data based on the division of the data.

4. The method according to claim 1, wherein the representative client transmits, when the representative client receives resend requests for the cached block data from the other clients among the plurality of clients, the block data to the other clients by multicast communication or unicast communication.

5. The method according to claim 1, wherein the representative client transmits a resend request for block data not normally received among block data preceding the block data to the other clients among the plurality of clients prior to the transmission of the response acknowledgement and receives, from the other clients, the block data not normally received.

6. The method according to claim 5, wherein the representative client transmits the resend request by multicast communication.

7. The method according to claim 6, wherein the other clients transmit the block data not normally received by multicast communication or unicast communication.

8. The method according to claim 1,
wherein the server transmits, after the server ends the transmission of the plurality of block data, a data transfer end indicating the end of the transmission of the data to the plurality of clients, and
wherein the plurality of clients respectively confirm all the plurality of block data are normally received and transmit response acknowledgements for the data transfer end to the server by multicast communication or unicast communication.

9. The method according to claim 8, wherein, when the server receives the response acknowledgements for the data transfer end from the plurality of clients, the server transmits communication end indicating end of the communication to the plurality of clients.

10. The method according to claim 1,
wherein, prior to start of the transmission of the data, the server creates, based on communication with the plurality of clients, a client list in which the plurality of clients that receive the data are registered, and
wherein the server assigns the representative client to each of the plurality of block data based on the client list in an order of registration in the client list in a round-robin manner.

11. The method according to claim 1, wherein the representative client confirms that the representative client normally receives all block data preceding the block data among the plurality of block data and transmits the response acknowledgement to the server based on the confirmation.

12. A method for communicating data in a server transmitting data including a plurality of block data to a plurality of clients by multicast communication, the method comprising:
assigning one of the plurality of clients as a representative client to one of the plurality of block data in a predetermined order, the representative client transmitting a response acknowledgment when a block data is received;
adding information indicating the representative client assigned to any one of block data to first block data, and transmitting the information to the plurality of clients by multicast communication;
transmitting, when the response acknowledgement from the representative client is received, second block data corresponding to the response acknowledgement to the plurality of clients together with information indicating a new representative client assigned to the second block data by multicast communication, the second block data following the first block data;
caching, in the representative client, the first block data to which the representative client corresponds for retransmitting the first block data to the other clients; and
discarding, in the representative client, the cached first block data relative to receiving information indicating that the representative client is assigned as a representative client for the second time.

13. A system comprising:
a first apparatus including a memory and a processor that executes a first program on the memory and transmits data including a plurality of block data to a plurality of second apparatuses by multicast communication; and
the plurality of second apparatuses including a memory and a processor that executes a second program on the memory, respectively,
wherein the first program includes a first process, the first process including:
assigning one of the plurality of second apparatuses as a representative apparatus to one of a plurality of block data in a predetermined order,
transmitting first block data among the plurality of block data to the plurality of second apparatus together with information indicating the representative apparatus among the plurality of second apparatuses assigned to the first block data by multicast communication, and
transmitting second block data among the plurality of block data to the plurality of second apparatuses together with information indicating a new representative apparatus among the plurality of second apparatus assigned to the second block data by multicast communication when a response acknowledgement from the representative client is received, the second block data following the first block data, and
wherein the second program includes a second process, the second process including:
transmitting a response acknowledgement to the first apparatus when the first block data is received,
caching the first block data to which the representative apparatus corresponds for retransmitting the first block data to the other second apparatus, and
discarding the cached first block data relative to receiving information indicating that the representative apparatus is assigned as a representative apparatus for the second time.

* * * * *